(12) United States Patent
Senft et al.

(10) Patent No.: US 11,507,202 B2
(45) Date of Patent: Nov. 22, 2022

(54) 3-D INPUT DEVICE

(71) Applicant: Deutsches Zentrum für Luft-und Raumfahrt e.V., Cologne (DE)

(72) Inventors: Volker Senft, Seefeld (DE); Josef Reill, Kaufering (DE); Armin Wedler, Munich (DE); Nikolaus Seitz, Oberpfaffenhofen (DE)

(73) Assignee: Deutsches Zentrum für Luft-und Raumfahrt e.V., Cologne (DE)

( * ) Notice: Subject to any disclaimer, the term of this patent is extended or adjusted under 35 U.S.C. 154(b) by 0 days.

(21) Appl. No.: 17/044,875

(22) PCT Filed: Apr. 5, 2019

(86) PCT No.: PCT/EP2019/058584
§ 371 (c)(1),
(2) Date: Oct. 2, 2020

(87) PCT Pub. No.: WO2019/193130
PCT Pub. Date: Oct. 10, 2019

(65) Prior Publication Data
US 2021/0103344 A1    Apr. 8, 2021

(30) Foreign Application Priority Data

Apr. 5, 2018  (DE) .................... 10 2018 205 159.3

(51) Int. Cl.
*G06F 3/0338*  (2013.01)
(52) U.S. Cl.
CPC .................. *G06F 3/0338* (2013.01)

(58) Field of Classification Search
CPC ... G06F 3/0338; G06F 1/169; G05G 9/04737; G05G 2009/04755
See application file for complete search history.

(56) References Cited

U.S. PATENT DOCUMENTS

| 4,785,180 | A  | 11/1988 | Dietrich et al. |
| 5,406,848 | A  | 4/1995  | Okada |
| 5,504,502 | A  | 4/1996  | Arita et al. |
| 9,134,817 | B2 | 9/2015  | Olsson |

(Continued)

FOREIGN PATENT DOCUMENTS

| DE | 3611337 A1     | 10/1987 |
| DE | 102010062458 A1 | 6/2012 |

(Continued)

*Primary Examiner* — Sahlu Okebato
(74) *Attorney, Agent, or Firm* — The Webb Law Firm

(57) ABSTRACT

A 3D input device, in particular a mobile 3D input device, has a housing and an input element arranged within the housing. The input element has at least a first side and a second side opposite the first side. The 3D input device has a sensor device. The input element is movable relative to the housing in six components. The sensor device detects the movements and/or the positions of the input element relative to the housing. The first side of the input element or the second side of the input element or the first side and the second side of the input element are together configured in such a way that a user can complete a movement of the input element along the six components via an action on the input element. A mobile device and a 3D remote-control each have at least one such 3D input device.

16 Claims, 5 Drawing Sheets

(56) References Cited

U.S. PATENT DOCUMENTS

| | | | |
|---|---|---|---|
| 2005/0231476 A1* | 10/2005 | Armstrong | G06F 3/016 345/161 |
| 2012/0215475 A1 | 8/2012 | Rutledge et al. | |
| 2012/0287032 A1* | 11/2012 | Olssen | G06F 3/0338 345/156 |
| 2013/0178293 A1 | 7/2013 | Nakayama et al. | |
| 2014/0152628 A1* | 6/2014 | Algreatly | G06F 3/014 345/179 |
| 2015/0220197 A1* | 8/2015 | Algreatly | G06F 3/04815 345/173 |
| 2017/0269587 A1 | 9/2017 | Hong | |

FOREIGN PATENT DOCUMENTS

| | | |
|---|---|---|
| DE | 102017206025 A1 | 10/2018 |
| EP | 0480471 A2 | 4/1992 |
| JP | 2013210888 A * | 10/2013 |

\* cited by examiner

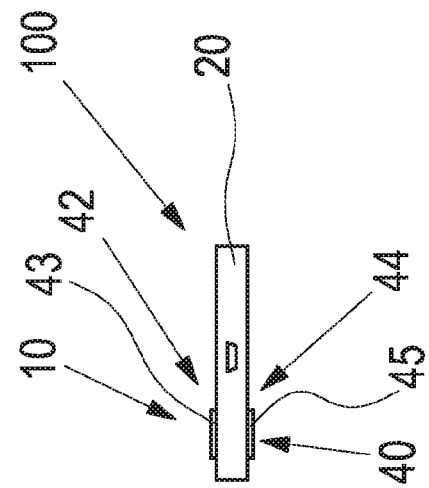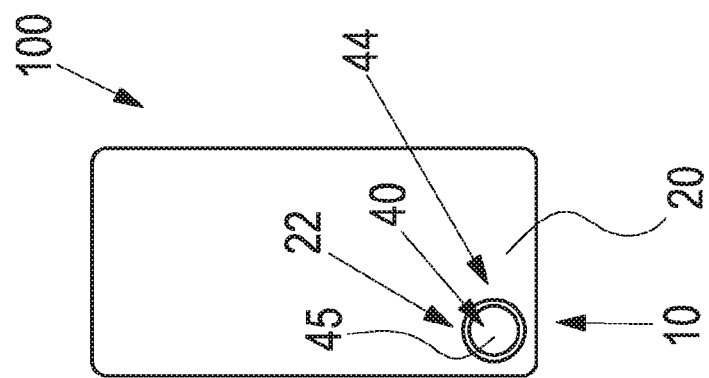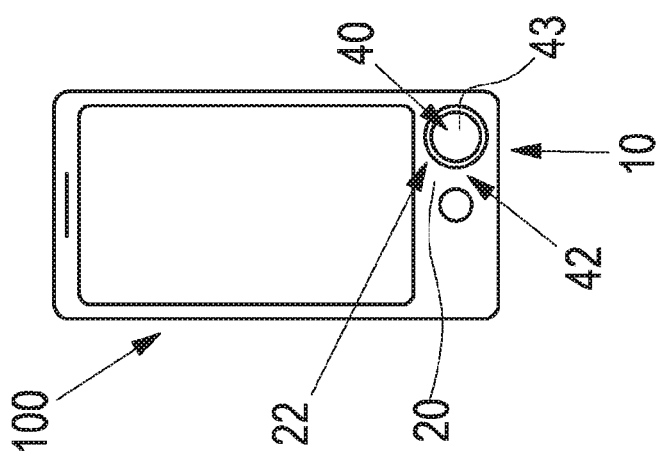

3-D INPUT DEVICE

CROSS-REFERENCE TO RELATED APPLICATIONS

This application is the United States national phase of International Application No. PCT/EP2019/058584 filed Apr. 5, 2019, and claims priority to German Patent Application No. 10 2018 205 159.3 filed Apr. 5, 2018, the disclosures of which are hereby incorporated by reference in their entirety.

BACKGROUND OF THE INVENTION

Field of the Invention

The disclosure relates to a 3D input device, in particular a mobile 3D input device. The disclosure further relates to a mobile device as well as to a 3D remote control which each comprise at least one 3D input device of the disclosure.

Description of Related Art 3D input devices are used in particular to transmit three-dimensional inputs, e.g. three-dimensional movement commands, to a computer system. For example, so-called 3D mice are used in 3D construction software to move objects in a virtual 3D environment or to allow the user to maneuver through a virtual 3D landscape. Preferably, such input devices are implemented in designing 3D constructions, also referred to as CADs, with the aid of computing. In addition, 3D input devices may be used in joysticks, gaming consoles, data gloves, computer keyboards, computer mice, track pads, touch pads or remote controls. Another field of application for 3D input devices are remote controls for robots, e.g. for drones.

3D input devices are characterized in particular in that all relative movements and/or relative positions of two objects with respect to each other can be displayed or inputted using such devices. Such relative movements and/or relative positions can be described by six components, namely three displacements (X, Y, Z) and three angular rotations (A, B, C) in or about the three axes of the Cartesian coordinate system. For displaying or inputting the six components, conventional 3D input devices comprise an input element which is movable relative to a fixed base element along the six components. These relative movements and/or relative positions are detected by means of a sensor device. In this manner, it is possible e.g. to move virtual objects or robots, such as drones, in space along the six components.

Conventional 3D input devices are known inter alia from DE 36 11 337 A1 as well as from US 2012/0215475 A1.

Input devices of the prior art suffer from the drawback that they are large and are therefore not suitable for mobile or portable use.

It is an object of the present disclosure to provide a miniaturized 3D input device, in particular a miniaturized mobile 3D input device. Further, it is an object to provide a mobile device and a 3D remote control which are also miniaturized.

The object is achieved with a 3D input device, a mobile device and a 3D remote control.

SUMMARY OF THE INVENTION

The 3D input device of the present disclosure specifically is a mobile 3D input device which preferably is portable. The 3D input device comprises a housing and an input element arranged in the housing. The input element is preferably arranged in an opening, e.g. a bore, in particular an opening extending through the housing. It is preferred that physical access to the input element is possible from outside the housing, e.g. via the opening. On the one hand, it is preferred that the input element is arranged completely in the housing, i.e. within the contour of the housing. In this case, the input element is at least partly flush with the contour of the housing. On the other hand, it is preferred that the input element protrudes beyond the contour of the housing. As a consequence, the input element protrudes out from the housing. In the case of such outward protruding, it is possible that the input element protrudes only from the housing on one side or on a plurality of sides. If, for example, the input element has the shape of a circular cylinder and the housing has the shape of a cuboid, it is possible that the input element protrudes from the cuboid only by the portion that is in the vicinity of the base of the cylinder shape. It is also possible that the input body protrudes on two sides from the cuboid shape of the housing by the above described portion and the portion opposite this portion, i.e. opposite the base of the cylinder shape. If, for example, the input element has the shape of a sphere and the housing is in the shape of a cube, it is possible that the sphere protrudes from all six sides of the cube. The input element of the 3D input device of the present disclosure comprises at least one first side and a second side opposite the first side. Preferably, the sides oppose each other in parallel, in particular really parallel. These sides primarily describe regions of the input element or the vicinity of the input element. However, these sides may also represent physical surfaces or portions of the input element. Furthermore, the 3D input device of the present disclosure comprises a sensor device. The sensor device is preferably arranged between the housing and the input element. It is also possible that the sensor device is connected with the housing and/or the input element. In the case of such a connection of the sensor device with the housing and/or the input element, it is preferred that the sensor device is arranged on the housing and/or on the input element. The input element is movable relative to the housing in six components, namely three displacements and three angular rotations, in or about the three axes of the Cartesian coordinate system. The sensor device detects movements and/or positions of the input element relative to the housing. The first side of the input element or the second side of the input element or the first and the second side of the input element together are designed such that a user can perform a movement of the input element along the six components by acting on the input element. Such an action of a user on the input element refers in particular to the input element being touched and/or gripped by the user, preferably using one or more fingers.

It is preferred that the input element is of cylinder shape, in particular circular cylinder shape. With such a shape of the input element it is preferred that the first side of the input element corresponds to the base of the cylinder shape of the input element. It is possible that the cylinder shape is a solid cylinder shape, however, a hollow cylinder shape is also conceivable. A cylinder shape is not necessarily a circular cylinder shape. Shapes such as prisms or spheres etc. are also included thereby.

Instead of a cylinder shape of the input element, it is also possible that the input element is in the shape of a sphere.

In a preferred embodiment the input element of the 3D input device of the present disclosure has a first surface on the first side and/or a second surface on the second side.

Both of these surfaces may be designed independently of each other e.g. to be convex or concave or planar. If the input element has a cylinder shape, the first surface is preferably the base of the cylinder and the second surface is the surface of the cylinder opposite the base. The first and/or the second surface are arranged for access by a user, so that a user preferably has active access to the first and/or second surface. Here, the design of the 3D input device, in particular of the input element, is such that at least one surface, in particular both surfaces at the same time, can be caused by a user to move. Such a movement of the input element is performed such that the input element can be deflected along the six components relative to the housing.

Preferably, the input element has an opening extending from the first side to the second side. The opening diameter of this opening corresponds in particular substantially to the diameter of a human finger. In addition, the opening is preferably designed such that a user can reach into the opening at least on one side, in particular on both sides.

The 3D input device preferably comprises at least one loop, in particular a finger loop. This at least one loop is connected with the input element on the first side of the input element and/or on the second side of the input element. The loop is preferably connected with the first surface of the input element and/or the second surface of the input element.

In a preferred embodiment the housing of the 3D input device corresponds to the housing of a mobile device. The mobile device is in particular a mobile phone or a tablet computer or a laptop, preferably a convertible notebook, or a navigation device. In such an embodiment, in which the housing of the 3D input device corresponds to the housing of a mobile device, it is preferred that a necessary power supply and/or an evaluation device of the 3D input device, in particular the sensor device, is provided via the existing power supply and/or computing power of the mobile device. For example, the sensor device may be connected with the rechargeable battery of a mobile device for the transmission of power. It is also possible that the sensor device is connected with the processor of a mobile device for the transmission of data.

The sensor device comprises in particular at least one sensor unit. A sensor unit in turn comprises at least one, preferably magneto-resistive sensor and at least one, preferably magnetic transmitter associated with the sensor. As such, each sensor unit is configured such that it detects at least one component of the movement of the input element relative to the housing. The at least one sensor preferably is a sensor of the AMR (anisotropic magneto-resistance), GMR (giant magneto-resistance), CMR (colossal magneto-resistance) or TMR (tunnel magneto-resistance) type. In the case of a plurality of sensors, it is possible to use different sensor types.

It is preferred that the at least one sensor unit is embodied as defined for the sensor unit in DE 10 2017 206 025.5.

Moreover, it is preferred that the 3D input device comprises at least six sensor units, each sensor unit comprising, in particular exactly, one sensor and/or, in particular exactly, one transmitter.

In a preferred embodiment the at least one sensor is a one-dimensional sensor. Specifically, the transmitter is embodied as a magnet, preferably a permanent magnet. A one-dimensional sensor is such a sensor with a one-dimensional sensor direction along which the sensor can detect movements of the transmitter associated therewith. Preferably, it is a magneto-resistive sensor measuring the direction of field lines to determine a movement.

Preferably, at least three sensors are arranged in parallel with respect to their sensor direction, and at least three further sensors are also arranged in parallel with respect to their sensor direction, the sensor direction of the first at least three sensors is perpendicular to the sensor direction of the other at least three sensors. It is preferred that in the case of exactly six sensors, the first three sensors and the further three sensors are arranged, respectively, on a circular path at a distance of 120° with respect to each other. Here, it is particularly preferred that all sensors have a distance of 60° from each other, respectively. The circular path of the first sensors and the circular path of the other sensors are preferably each arranged in a respective plane, the two planes preferably lying one within the other or being really parallel. With really parallel planes it is possible that the sensors are arranged such that a connecting line between one sensor of the first three sensors and one sensor of the other three sensors is perpendicular to the planes, the arrangement of the sensors preferably being such that three such connecting lines exist.

As described above, a magneto-resistive sensor detects the field lines emanating from a magnet. Here, the direction of the field lines is measured, not the field strength. When the magnet and the magneto-resistive sensor move relative to each other—along the sensitive sensor direction—the sensor can measure the position relative to the magnet. With movements orthogonal to that direction, this results in no or almost no change in the measured position.

If four magneto-resistive sensors or partial sensors are connected, e.g. in a chip, to form a Wheatstone measuring bridge, two voltages are obtained that depend on the existing magnetic field. The magnetic field is generated by a magnet and the resultant two voltages represent the sine and cosine signal of the position sensor.

By applying the arc tangent $\alpha = \arctan 2(\text{cosine signal, sine signal})$, the two sensor voltages can be combined into the angle $\alpha$. Its range of values is from $-\pi$ to $+\pi$. Values beyond that result in ambiguous measuring values, since the function arctan 2( ) is a periodic function—with the period $2\pi$. A simple scaling converts the measuring value angle $\alpha$ from $-\pi$ to $+\pi$ into a distance—for example, mm. Given a total of six individual sensor units, there are six measuring values $\alpha_1, \alpha_2, \alpha_3, \alpha_4, \alpha_5, \alpha_6$.

A suitable calibration matrix can convert the six distances determined into the coordinates of the displacement (X, Y, Z) and of the angular rotation (A, B, C).

The movement of the magnet along the movement direction in which the magneto-resistive sensor is sensitive, i.e. the sensor direction, results in a quasi linear change in the measured position. The associated calibration matrix M can be calculated from the geometric arrangement of at least six individual sensor units.

$$\begin{pmatrix} X \\ Y \\ Z \\ A \\ B \\ C \end{pmatrix} = M \begin{pmatrix} \alpha_1 \\ \alpha_2 \\ \alpha_3 \\ \alpha_4 \\ \alpha_5 \\ \alpha_6 \end{pmatrix}$$

A second possible manner in which to determine the calibration matrix is by calibration. Here, known deflections of the arrangements are performed and the associated measuring values of all sensor units are detected. A calibration matrix can be calculated from these as well.

Above-mentioned and possible further and/or additional evaluations, such as e.g. calculations for determining the relative movement and/or the relative position from the detected sensor values, are performed by an evaluation device of the 3D input device. If the 3D input device is connected with a mobile device, it is preferred that the processor of the mobile device assumes the function of the evaluation device of the 3D input device.

In a preferred embodiment all sensors are connected with the housing, in particular mounted on the housing or integrated in the housing. As an alternative or in addition, all transmitters are connected with the input element, in particular mounted on the input element or integrated in the input element.

The 3D input device of the present disclosure in particular comprises at least one spring device. This at least one spring device is connected with the housing and/or the input element such that the input element, when in the rest position, has a fixed position, also referred to as a rest position, relative to the housing. This fixed position describes the position of the input element relative to the housing, when the input element is not moved relative to the housing or is not deflected relative to the housing. When the input element is moved relative to the housing, it returns to the rest position due to the spring device after the movement is completed, in particular when the input element is released. The connection of the spring device with the housing and/or the input element may e.g. be rigid or may also be a contacting connection. Such a contacting connection is designed in particular such that the spring device is not rigidly, e.g. integrally, connected with the housing and/or the input element, but that merely a contact exists therebetween. Preferably, this contact is permanent, i.e. also during any relative movements of the housing and the input element. On the other hand, it is also possible that no contact exists, at least temporarily, and that the spring device and the housing and/or input element thus are spaced from each other.

The spring device specifically comprises at least one elastic mat and/or at least one spring. The spring preferably is a classical deformation spring, such as e.g. a coil spring, or a wire spring, in particular of metal, or a rubber spring, such as e.g. rubber blocks. For the spring and the elastic mat, it is preferred to use materials which are free of hysteresis or have low hysteresis. Preferably, metals and/or plastic materials, such as e.g. elastomers, silicones or steels, are used as materials for the spring and/or the mat. It is preferred that the at least one elastic mat and/or the at least one spring is fixedly, in particular rigidly, with the housing on the one hand and the input element on the other hand. It is also possible that the spring and/or the mat is fixedly, in particular rigidly, connected only with the housing and/or the input element. If, for example, wire springs are used, it is possible that one end thereof is rigidly connected with the housing, while the other end merely protrudes over the input element or contacts the same. In addition, it is possible to use a hose as the spring. In this case, a configuration is preferred in which the hose extends, e.g. tensioned, over the input element and is rigidly connected with the housing in the region of the hose ends. If, in contrast, e.g. coil springs are used as the springs, these may be arranged between the housing and the input element and may be rigidly connected with the housing on the one hand and with the input element on the other hand. It is preferred that the spring device comprises at least two elastic mats. These elastic mats are preferably arranged such that the opening of the housing, in which the input element is arranged, is closed off to the environment on both sides by the mats. As an alternative or in addition, it is preferred that the spring device has at least three springs, e.g. wire springs, which are arranged in one plane spaced by 120° with respect to each other.

In a preferred embodiment the 3D input device comprises at least one stopper for restricting the mobility of the input element relative to the housing. The at least one stopper is preferably a mechanical resistor, e.g. a damper. The at least one stopper can be realized such that it prevents a movement of the input element relative to the housing that would cause damage to the mobility of the 3D input device. As an alternative or in addition, the stopper can be designed such that it defines a movement of the transmitter relative to the sensor of each sensor unit so that the transmitter is always in the sensor range to be covered by the sensor. Preferably, the stopper is connected with the housing and/or the input element.

A displacement and/or angular rotation, in particular of the input element, causes an extension or compression of spring and/or stopper devices installed. The forces occurring can be determined using the spring law F=c·s—with the force F in [N], the distance s in [mm] and the spring constant c in $$\left[\frac{N}{mm}\right].$$

Due to the geometrical arrangement of the spring and/or stopper devices, in particular die to the distance from the center of rotation, torques may also occur. Accordingly, the 3D input device presented herein can also detect forces and/or moments. Using a suitable calibration matrix, the 3D input device can determine and output forces and torques.

Applying Newton's law establishing the relationship between force, mass and acceleration (F=m·a, F in [N], m in [kg] and a in $$\left[\frac{m}{s^2}\right])$$

and the equivalent law regarding the relationship between torque, mass moment of inertia and angular acceleration (M =J·α, M in [Nm], J in [kgm$^2$] and α in $$\left[\frac{1}{s^2}\right]),$$

the 3D input device can also measure accelerations or angular accelerations, using a suitable calibration matrix.

It is preferred that the 3D input device comprises at least one acceleration sensor, in particular a three-dimensional sensor. The acceleration sensor detects the orientation and/or the movement of the housing and/or the input element in space. When the housing is held in an optional manner in space, the gravitation vector of earth acts correspondingly on the 3D input device with an orientation. This may result in a detected deflection of the input element relative to the housing. Using at least one acceleration sensor, it is possible to eliminate this detected deflection. It is preferred that the housing comprises the at least one acceleration sensor.

The mobile device specifically is a mobile phone or a tablet computer or a laptop or a navigation device comprising at least one 3D input device of the present disclosure. It is preferred that the mobile device comprises two 3D input devices. If the mobile device is a mobile phone, it is possible to arrange the 3D input device below the display where often a home key is located. Here, it is preferred that the 3D input device assumes the function of the home key, as well as other functions, if so desired, according to the function of the 3D input device. If the 3D input device is also used as a key, in particular a home key, it is preferred to define a threshold value so that key functions, such as "pushed" or "not pushed", can be derived from the continuous sensor measuring values. If the mobile device has two 3D input device of the present disclosure, these are preferably arranged on either side of a display of the mobile device.

The 3D remote control of the present disclosure comprises at least one 3D input device of the present disclosure, the housing being connectable with a mobile phone or a tablet computer or a laptop or a navigation device. Preferably, such a connection is an attachable or pluggable connection that is not formed integrally. In this case, the housing can be designed such that is essentially corresponds to the shape of a handy cover or a tablet cover and can be connected with a mobile phone or a tablet computer in a corresponding manner. Here, it is preferred that the 3D input device is connected with the mobile device for the transmission of data and/or power. This may be realized e.g. such that the housing can be connected with the charging device port of a mobile device via a plug-in connection. As an alternative or in addition, a data and/or power transmission through induction and/or a wireless connection is also possible.

BRIEF DESCRIPTION OF THE DRAWINGS

The disclosure will be described in more detail hereunder with reference to preferred embodiments and to the accompanying drawings. In the Figures:

FIGS. 2a, 2b, 2c show different schematic views of a 3D input device according to the present disclosure within the framework of a mobile device.

In the Figures like elements are identified by like reference numerals.

DESCRIPTION OF THE INVENTION

Figure 1:
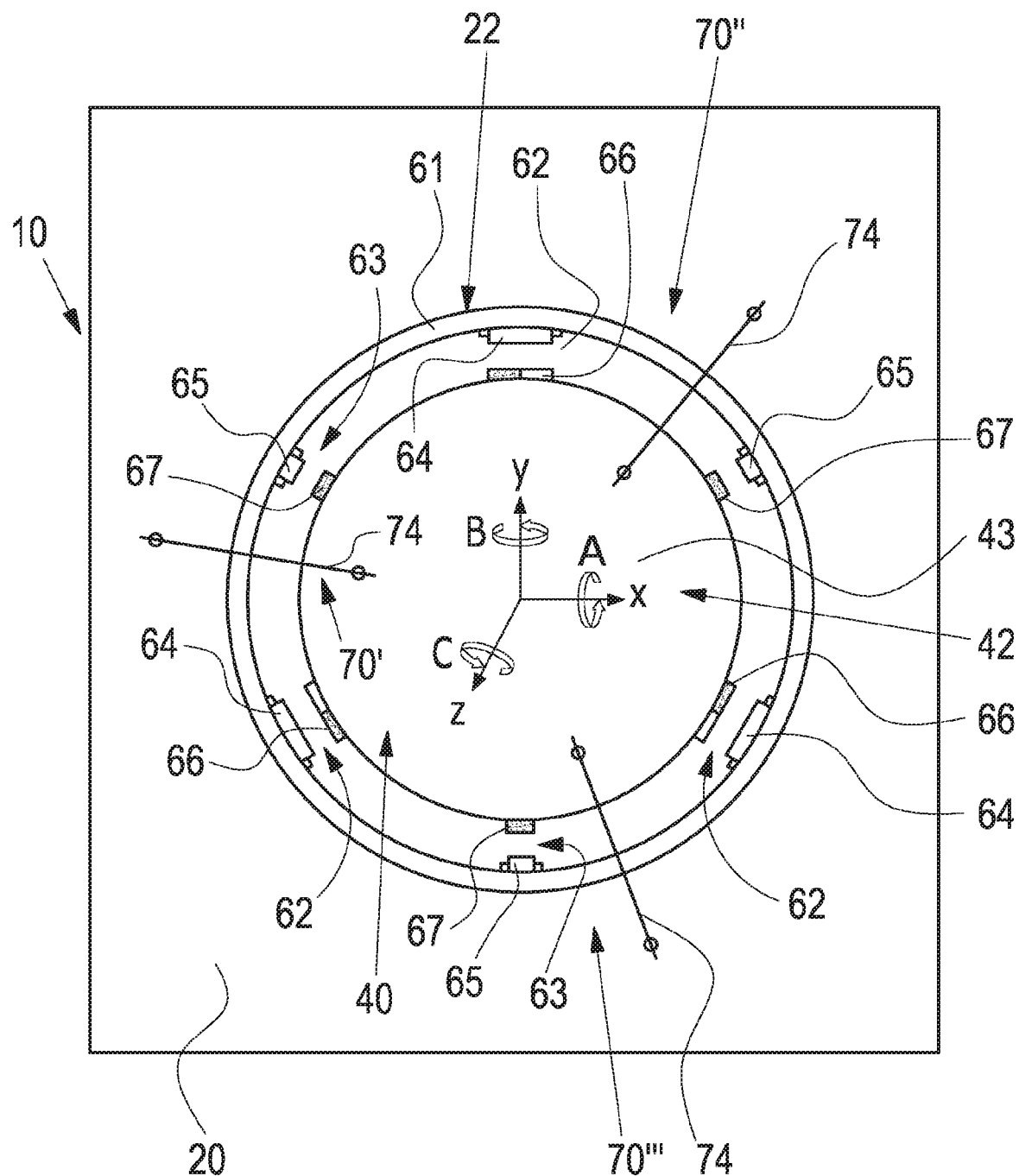
FIG. 1 is a schematic top plan view of a 3D input device according to the present disclosure.

The 3D input device 10 of FIG. 1 comprises a cuboid-shaped housing 20. The housing 20 is provided with a bore 22 extending from the upper side to the lower side. A hollow cylinder 61 is arranged in the bore. This hollow cylinder 61 is connected with the housing 20 in a manner secured against rotation. It is also possible that the hollow cylinder 61 and the housing 20 are formed in one piece, also referred to as integrally.

Six one-dimensional magneto-resistive sensors 64, 65 are arranged on the inward directed shell surface of the hollow cylinder 61. In the embodiment illustrated, these sensors 64, 65 are three sensors 64 with a sensor direction parallel to the image plane. These three sensors 64 are arranged at a distance of 120° from each other. Three sensors 65 with a sensor direction extending orthogonal to the image plane are also illustrated as being arranged at a distance of 120° from each other.

An input element 40 is situated in the hollow cylinder 61, wherein, in the embodiment illustrated, the first surface 43 on the first side 42 of the input element 40 can be seen. FIG. 1 does not show the second surface 45 on the second side 44 of the input element 40 which is on the opposite, rear side.

According to the coordinate system illustrated in the center, the input element 40 is freely movable relative to the housing 20 or the hollow cylinder 61. As a consequence, the input element can be moved relative to the housing 20 along the six components, namely three displacements X, Y, Z and three angular rotations A, B, C.

For keeping it in a rest position, the input element 40 is connected with the housing 20 via a spring device 70 (70', 70", 70''') formed by three springs 74. Here, the springs are each fixedly, in particular rigidly, connected at the two end portions with the input element 40 on the one hand and the housing 20 on the other hand. In contrast to the embodiment illustrated it is also possible, e.g. when wire springs are used as the springs 74, that the springs 74 are fixedly connected only with the housing 20 and merely protrude over the input element 40, or contact the same, while the springs 74 have no rigid connection with the input element 40. The spring device 70 prevents the input element 40 from falling out of the housing. Moreover, the spring device 70 defines a rest position of the input element relative to the housing 20 to which the input element 40 returns after a deflection, in particular when it is released.

In the embodiment illustrated, the input element 40 has a solid cylinder shape. On the outward directed shell surface of the cylinder shape of the input element 40 six magnetic transmitters 66, 67 are arranged, respectively associated to the sensors 64, 65. In the embodiment illustrated, the six transmitters are permanent magnets 66, 67. The permanent magnets 66, 67 are arranged according to the sensor directions such that their magnetization, i.e. the connecting line between the two poles of the magnets 66, 67, is parallel to the sensor direction of the respective associated sensor 64, 65. Thus, the magnets 66 have a magnetization parallel to the image plane, and the magnets 67 have a magnetization orthogonal to the image plane. The three magnets 66, as well as the three magnets 67 are each arranged at a distance of 120° with respect to each other.

A magnet 66, 67 and a sensor 64, 65 associated to this magnet together form a sensor unit 62, 63. Per sensor unit 62, 63, the respective sensor 64, 65 measures the relative movement of the magnet 66, 67 with respect to this sensor 64, 65. By an evaluation of all measured movements of the magnets 66, 67 by the sensors 64, 65, the relative movement and/or the relative position of the input element 40 with respect to the housing 20 can be determined according to all six components.

Instead of an arrangement of the springs 74 on the top surface of the housing 20 and the input element 40, as illustrated, it is also possible to arrange the springs 74 on the lower side or on the lower side and the upper side. It is further possible to arrange the springs centrally between the upper and lower sides. Furthermore, any other number of springs is possible.

The following FIGS. 2 to 6 illustrate mobile devices 100 comprising 3D input devices 10 according to the present disclosure. The embodiments described herein with respect to the 3D input device 10 are also conceivable and valid without a mobile device. For example, in such a case the mobile device 100 corresponds to the housing 20 of the 3D input device 10 of the present disclosure.

FIG. 2a shows a top plan view on a mobile device 100 which is a cell phone, e.g. a smartphone. On the lower side the cell phone 100 has a bore 22 through the housing 20 of the cell phone 100. A solid-cylinder-shaped input element 40 is arranged in the bore 22, of which FIG. 2a shows the first surface 43 on the first side 42 of the input element 40. In contrast to the 3D input device 10 of FIG. 1, the 3D input device 10 of FIG. 2a comprises no hollow cylinder 61. Thus, the sensors 54, 65 are arranged directly on the inward directed bore surface of the bore 22 of the housing 20. Similar to the embodiment in FIG. 1, the transmitters 66, 67 are located on the shell surface of the cylinder shape of the input element 40.

FIG. 2b shows a rear view of the mobile device 100 of FIG. 2a. Here, the second surface 45 on the second side 44 of the input element 40 can be seen.

FIG. 2c is a side view of the mobile device 100 of FIGS. 2a and 2b, showing the lower side of the cell phone. Here, it can be seen that the two regions on the first side 42 and the second side 44 of the input element 40 are not flush with the contour of the housing 20 of the mobile device 100. Two regions of the input element 40, comprising the first surface 43 and the second surface 45, thus protrude from the housing 20.

Figure 3:
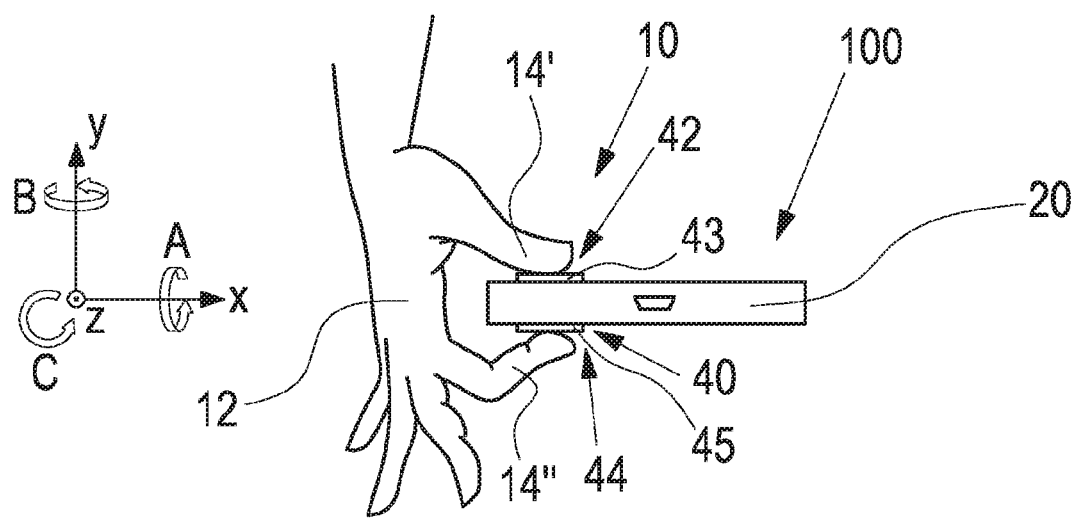
FIGS. 3 to 6 show schematic side views of different embodiments of 3D input devices according to the present disclosure in mobile devices and FIG. 7 is a schematic sectional view of a further embodiment of a 3D input device according to the present disclosure.

FIG. 3 shows the mobile device 100 of FIGS. 2a, 2b and 2c with the hand 12 of a user. The thumb 14' and the index finger 14" of the hand 12 rest on the first surface 43 on the one hand and on the second surface 45 of the input element 40 on the other hand. By gripping the input element 40 in this manner with the hand 12 of a user, the user can deflect the input element 40 relative to the housing 20. When, for example, the user moves both fingers in the same direction along a plane orthogonal to the drawing plane, the input element 40 performs a displacement along X, Y, Z relative to the housing 20. When, for example, the user moves both fingers 14', 14" out or the drawing plane in a direction orthogonal to the drawing plane, while gripping the input element 40, the input element 40 performs a displacement along the Z-axis (coordinate system illustrated), the Z-axis being orthogonal to the drawing plane. When, for example, the user moves the thumb 14' out of the drawing plane in a direction orthogonal to the drawing plane (in Z-direction) and moves the index finger 14" into the drawing plane in a direction orthogonal to the drawing plane (opposite the Z-direction), the input element 40 performs an angular rotation A about the X-axis. When the user performs a unidirectional rotation of both fingers 14', 14" in a direction tangential to the cylinder-shaped input element 40, the input element 40 performs an angular rotation B around the Y-axis. Such movements of the input element can be combined to thereby perform an in particular simultaneous movement of the input element 40 relative to the housing 20. Movements detected in this manner via the 3D input device 40 can then be used e.g. as input commands.

Figure 4:
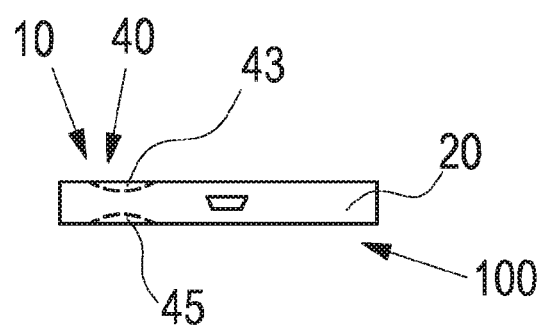

FIG. 4 illustrates a further embodiment of the mobile device 100 with the 3D input device 10 of the present disclosure. Instead of the embodiment of the input element 40 of FIG. 3, in which the input element 40 protrudes from the housing 20, the input element 40 of FIG. 4 is flush with the housing 20. Here, the input element 40 has the shape of a solid cylinder, the first surface 43, which corresponds to the base of the cylinder shape, comprising a trough shape which may also be referred to as a concave surface 43. The second surface 45 opposite this surface 43 is also designed to be concave. In contrast to the embodiment illustrated, a combination of concave, convex or planar configurations of the first surface 43 and the second surface 45 is also possible. It is also possible that the input element 40 does not protrude beyond the housing 20 and is also not flush with the housing 20, but is arranged completely within the housing 20.

Figure 5:
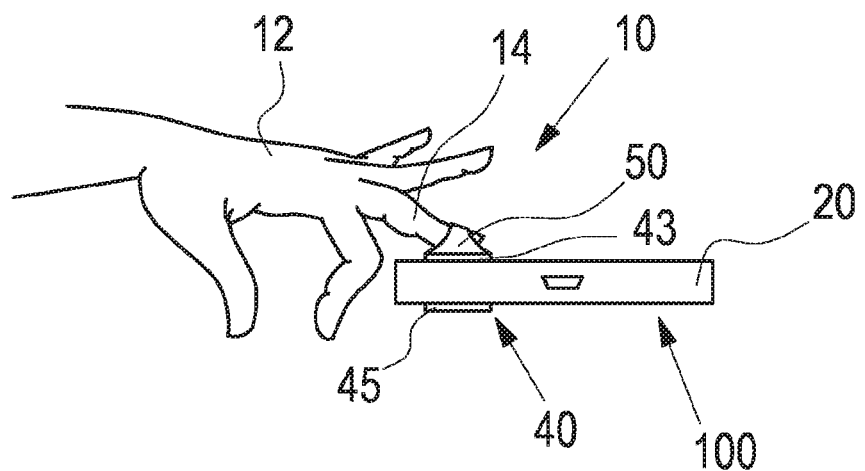

FIG. 5 illustrates a further embodiment of a mobile device 100 with a 3D input device 10 according to the disclosure. The embodiment illustrated essentially corresponds to the embodiment in FIG. 3, with a loop 50, specifically designed as a finger loop, being arranged in the first surface 43. This loop 50 is connected with the first surface 43 of the input element 40. In this manner, the user can reach into the loop 50 with one or more fingers 14 and can thus achieve a deflection of the input element 40 along the six components without gripping the first surface 43 and the second surface 45 from both sides.

Figure 6:
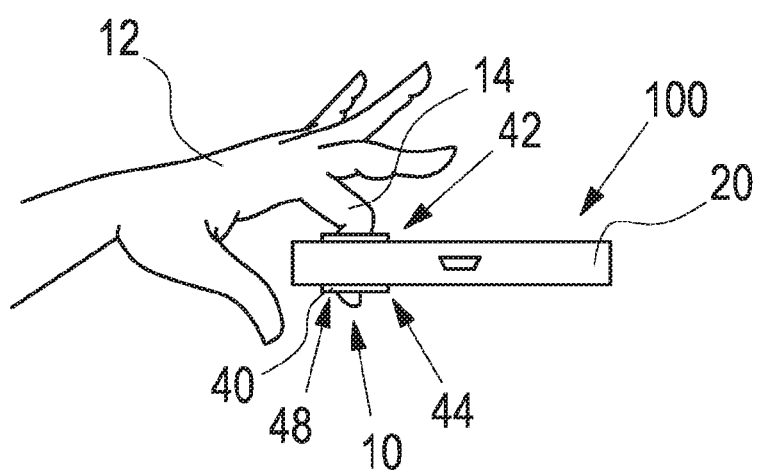

FIG. 6 illustrates another embodiment of a mobile device 100 with a 3D input device 10 according to the disclosure. In contrast with the above-mentioned embodiments, the input element 40 does not have a solid cylinder shape, but a hollow cylinder shape. The input element 40 may have an opening 48 extending from the first side 42 to the second side 44. Thus, a user can reach into and/or through the input element 40 with one or more fingers 14. With a view to the embodiment of FIG. 5, it is again possible to cause a deflection of the input element along the six components from one side and/or using only one finger. Here, the user reaches into the inner shell surface of the hollow cylinder of the input element 40 with one finger 14. The diameter of the hollow cylinder of the input element 40 corresponds substantially to the diameter of a human finger so that it is ensured that the hollow cylinder contacts the finger as closely as possible. Again, the sensors are arranged on the outer shell surface of the cylinder shape of the input element 40.

Figure 7:
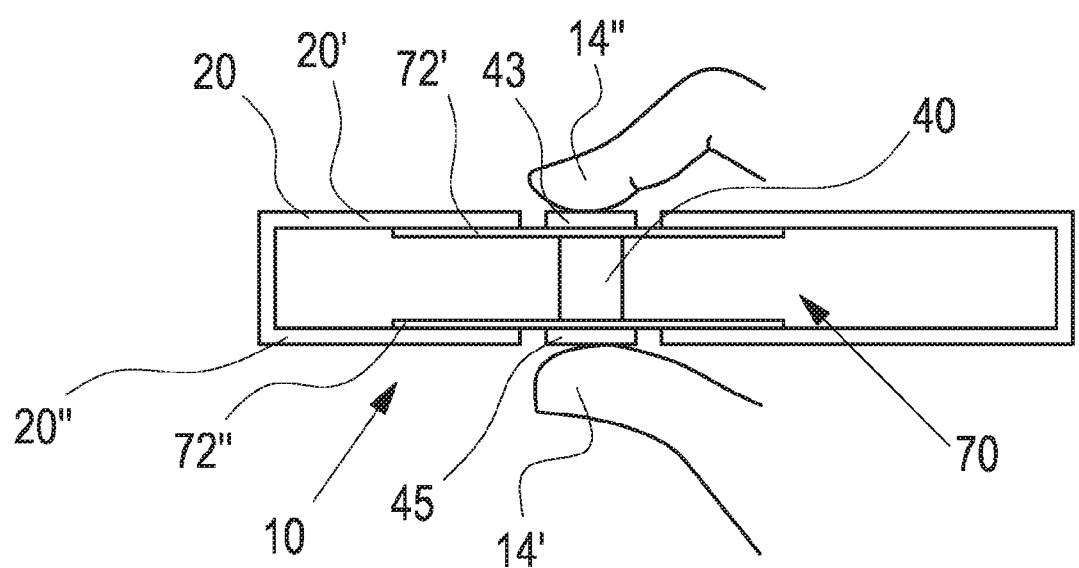

FIG. 7 illustrates a further embodiment of a 3D input device 10 according to the disclosure. Instead of the spring 74 of FIG. 4, the input element 40 is supported near the housing 20 by a spring device 70 which comprises two elastic mats 72', 72". The elastic mats 72', 72" are each fixedly connected with the housing 20 and are fixedly connected with the input element 40. On the one hand, these fixed connections prevent a slipping of the elastic mats 72', 72". The elasticity of the elastic mats 72', 72" is effective preferably only between the housing 20 and the input element 40. A deformation of the elastic mats 72', 72" due to an action by a user causes a restoring force tending to return the input element 40 to the rest position. Preferably, the elastic mats 72', 72" are hysteresis-free or low-hysteresis mats such that the input element 40 returns to the rest position. Instead of the embodiment illustrated in which the elastic mats 72', 72" are arranged within the housing 20 on the housing walls 20' and 20", it is also possible that the elastic mats 72', 72" are arranged on the outer sides of the housing walls 20', 20" of the housing 20. An arrangement of the mats 72', 72" within the bore is possible, flush with the housing 20 towards the outside, so that a flush appearance without gaps between the housing 20 and the input element 40 is provided. Besides the spring function of the elastic mats 72', 72", the mats allow for a closure or a sealing against external environmental influences e.g. on the inside of the mobile device 100.

The invention claimed is:

1. A 3D input device comprising:
   a housing including a bore extending from an upper side of the housing to a lower side of the housing;

an input element having a shape arranged in the bore of the housing, the input element having a first side and a second side opposite the first side; and a sensor device;

wherein the input element is movable in six components relative to the housing, namely three displacements and three angular rotations in and about the three axes of the Cartesian coordinate system, respectively;

wherein the sensor device detects the movement of the input element relative to the housing;

wherein the first side or the second side or both sides together are configured such that a user can perform a movement of the input element along the six components by an action on the input element;

wherein the sensor device comprises at least six sensor units, each sensor unit comprising:

a one-dimensional sensor, and a transmitter associated with the one-dimensional sensor, wherein the transmitter includes a magnet; and at least one spring device, the spring device being connected with the housing or the input element such that the input element, when in a rest position, has a fixed position relative to the housing;

wherein the spring device comprises at least one elastic mat; and wherein each sensor unit detects a different movement component of the six components of the input element relative to the housing than the other sensor units.

2. The 3D input device of claim 1, wherein the input element has a cylindrical shape, the first side corresponding to the base of the cylindrical shape.

3. The 3D input device of claim 1, wherein the input element further comprises:

a convex or concave or planar first surface on the first side, or a convex or concave or planar second surface on the second side, wherein the first surface or the second surface are arranged to be accessible to the user such that at least one surface can be caused to move by the user.

4. The 3D input device of claim 1, wherein an opening of the input element extends from the first side to the second side.

5. The 3D input device of claim 1, further comprising at least one loop, the at least one loop being connected with the input element on the first side or the second side.

6. The 3D input device of claim 1, wherein the housing corresponds to a housing of a mobile device.

7. The 3D input device of claim 1, wherein each sensor unit comprises exactly one sensor or exactly one transmitter.

8. The 3D input device of claim 1, wherein each one-dimensional sensor is connected with the housing, or each transmitter is connected with the input element.

9. The 3D input device of claim 1, further comprising at least one stopper, for restricting the mobility of the input element relative to the housing.

10. The 3D input device of claim 1, further comprising at least one acceleration sensor, the acceleration sensor detecting the orientation or the movement of the housing or the input element in space.

11. A mobile device, comprising:

a housing including a bore extending from an upper side of the housing to a lower side of the housing; and at least one 3D input device including:

an input element having a shape arranged in the bore of the housing, the input element having a first side and a second side opposite the first side, wherein the first side of the input element is flush with the upper side of the housing, wherein the second side of the input element is flush with the lower side of the housing, and a sensor device;

wherein the input element is movable in six components relative to the housing, namely three displacements and three angular rotations in and about the three axes of the Cartesian coordinate system, respectively;

wherein the sensor device detects the movement of the input element relative to the housing;

wherein the first side or the second side or both sides together are configured such that a user can perform a movement of the input element along the six components by an action on the input element;

wherein the sensor device comprises at least six sensor units, each sensor unit comprising:

a one-dimensional sensor, and a transmitter associated with the one-dimensional sensor, wherein the transmitter includes a magnet;

wherein each sensor unit detects a different movement component of the six components of the input element relative to the housing than the other sensor units.

12. A 3D remote control comprising a 3D input device of claim 1, the housing being configured for connection with a mobile phone or a tablet computer or a laptop or a navigation device.

13. The 3D input device of claim 1, wherein an outward directed shell surface of the shape of the input element between the first side and the second side of the input element includes each magnetic transmitter of the at least six sensor units.

14. The mobile device of claim 11, wherein an outward directed shell surface of the shape of the input element between the first side and the second side of the input element includes each magnetic transmitter of the at least six sensor units.

15. The 3D input device of claim 1, wherein each one dimensional sensor of the at least six sensor units is arranged directly on an inward directed bore surface of the bore of the housing.

16. The mobile device of claim 11, wherein each one dimensional sensor of the at least six sensor units is arranged directly on an inward directed bore surface of the bore of the housing.

* * * * *